United States Patent [19]
Smith

[11] 3,789,909
[45] Feb. 5, 1974

[54] DIP CASTING METHOD USING TRANSPIRATIONALLY COOLED MOLD HAVING RELIEVED IMPERVIOUS OUTER LAYER

[75] Inventor: Oscar H. Smith, Muncie, Ind.

[73] Assignee: General Motors Corporation, Detroit, Mich.

[22] Filed: Nov. 7, 1972

[21] Appl. No.: 304,353

[52] U.S. Cl. ............................................. 164/87
[51] Int. Cl. .......................................... B22d 11/06
[58] Field of Search ...... 164/61, 124, 348, 278, 255, 164/77, 154, 155, 151, 156, 282 US, 281 US, 283 R, 283 MS, 283 MT, 82 US, 88, 87, 64, 63, 62, 122, DIG. 1, 121, 276 US, 277 US; 425/271, 269, 272, 275, 237, 405 US, DIG. 119

[56] References Cited
UNITED STATES PATENTS

| | | | |
|---|---|---|---|
| 1,070,500 | 8/1913 | Mackenzie | 164/62 |
| 2,801,445 | 8/1957 | Gienger, Jr. et al. | 425/271 |
| 2,867,847 | 1/1959 | Miller et al. | 425/275 |
| 3,455,371 | 7/1969 | Nichols | 164/87 |
| 3,581,809 | 6/1971 | DeWeese et al. | 164/348 |
| 3,744,547 | 7/1973 | Panhard | 164/61 |

*Primary Examiner*—J. Spencer Overholser
*Assistant Examiner*—V. K. Rising
*Attorney, Agent, or Firm*—Lawrence B. Plant

[57] ABSTRACT

In a dip casting process, a die is provided having a porous metal body, an impervious outer layer, a relieved surface on the outer layer and mold cavity in the porous body opening through the outer layer. The relieved surface provides a plurality of peaks/ridges for limited area contact with the melt. In operation, air is blown through the porous metal and out the porous walls of the mold cavity to cool them, and the impervious layer is heated to a temperature where casting metal will not adhere to the surface after the die leaves the melt. Shallow die immersion in the melt limits melt contact to the peaks/ridges on the surface thereby precluding any substantial chilling of the melt on the surface.

3 Claims, 3 Drawing Figures

PATENTED FEB 5 1974 3,789,909

DIP CASTING METHOD USING TRANSPIRATIONALLY COOLED MOLD HAVING RELIEVED IMPERVIOUS OUTER LAYER

This invention relates to an improvement to the die and method described in U.S. Pat. application Ser. No. 304,352, entitled "Dip Casting Method Using Transpirationally Cooled Mold Cavity," filed concurrently herewith in the names of Matter et al and assigned to the assignee of the present invention. For purposes of a more detailed description of the die and process involved here, the aforesaid U.S. Pat. application Ser. No. 304,352 is intended to be herein incorporated by reference. In general though that application involved dip casting intricate, thin-sectioned articles using transpirationally cooled mold cavities in porous metal dies having heated, impervious, low thermally conductive outer layers or shells. The impervious outer layer acts as a thermal barrier between the porous metal body of the die and the melt being cast. The surface layer is heated to, and maintained at, a melt-metal-shedding temperature and the mold cavity is transpirationally cooled to a much lower temperature e.g., below the solidification temperature of the melt. By melt-metal-shedding temperature is meant a temperature at which metal from the melt, even if slightly solidified, will not cling or adhere to the surface for any appreciable distance above the melt immediately after the die is drawn up out of the melt. The heated impervious layer effectively impedes the flow of heat from the high temperature melt into the cooled porous body during the short time interval in which the die contacts the melt. This results in little, if any, solidification of the melt against the outer surface of the impervious layer and when a thin film of melt does solidify against the surface it does not adhere thereto and readily falls back into the melt when the die is removed.

It is an object of the present invention to provide an unique impervious layer for the above described dies, the thermal conductivity of which layer can be varied substantially regardless of the thermal conductivity of the material comprising the layer.

It is a further object of this invention to provide a process for dip-casting with a transpirationally cooled die having a relieved impervious outer layer.

These and other objects and advantages of the present invention will become more apparent from the detailed description which follows in which.

Figure 1:
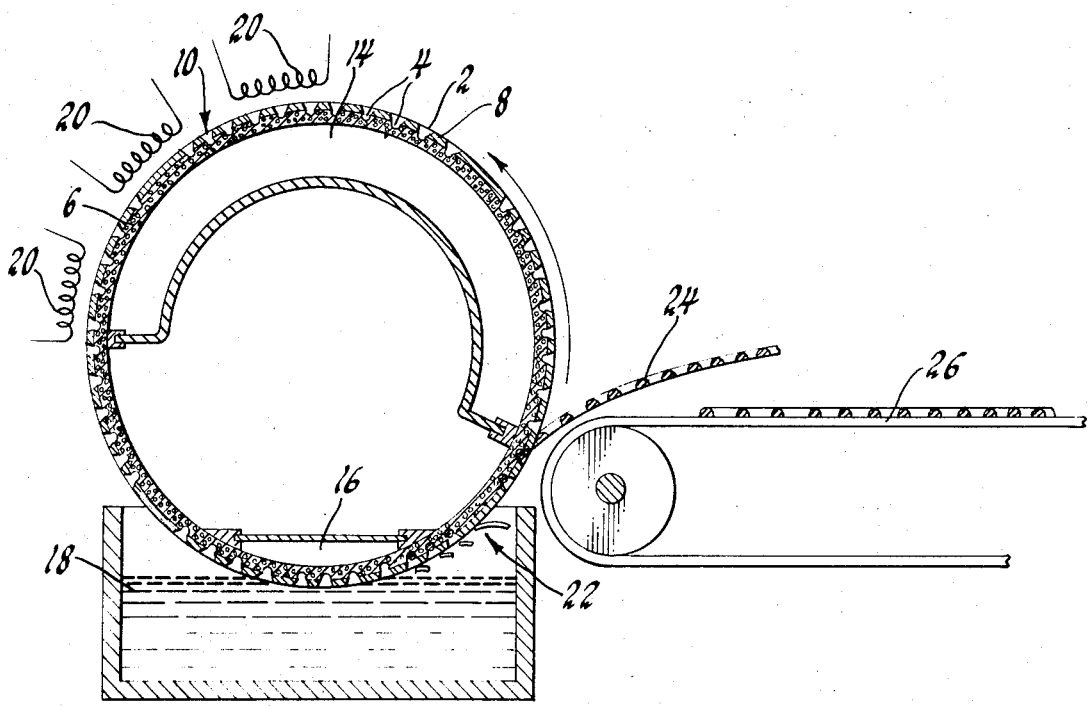
FIG. 1 is a sectioned side elevational view taken along the line 1—1 of FIG. 2.

According to the present invention, a transpirationally cooled porous metal dip-casting die of the type disclosed in Ser. No. 304,352 is provided with an impervious layer having a relieved outer surface. Relieving the surface provides a plurality of peaks/ridges and valleys on the melt-contacting surface of the die. When the die is shallowly immersed in the melt, the high surface tension of the melt prevents the melt from filling the valleys between the peaks. Melt contact is therefore limited to the peaks resulting in an effective thermal conductivity for the impervious layer which is substantially less than that of the material from which the layer is made. The effective thermal conductivity of the layer is controllable by simply increasing or decreasing the number or area of the peaks contacting the melt. The number or area of the peaks (peak density) can be varied across the face of a single die to obtain different effective thermal conductivities on different portions of the same die. The effective thermal conductivity of the layer, due to relieving surface varies nearly linearly with the surface area contacting the melt.

Relieving of the surface of the impervious layer may be accomplished in a number of ways. Likewise virtually any relief pattern is acceptable. In this regard, striations may be simply mechanically scribed into the surface. Likewise relieving may be accomplished by etching a pattern (e.g., multi-dot half toning) into the surface. Mechanically scribing striations on the surface is preferred because of its simplicity and ease of control. The striations can all be parallel as shown in the drawings or in a criss-cross pattern if so desired.

The thermal conductivity of the layer is kept low by keeping melt metal from filling the valleys/striations while the die surface is in the melt. Filling of the striations with melt depends on a number of factors, including the temperature of the layer, the temperature of the melt, the width and depth of the striations and the depth of immersion into the melt. In dealing with lead alloy melts about 50° F. above their freezing temperatures, striation widths of less than about 0.03 inch are effective in limiting melt penetration into the striations/valleys at immersion depth of less than 1/8 inch. Because of the shallow immersions used a vacuum is drawn behind the mold cavity to suck melt up into the mold cavity.

It has been observed that impervious layers having highly relieved surfaces according to this invention do not require any additional heating beyond that received from the casting melt. In this regard, due to the large mass of melt in the melt pot, the peaks get very hot very quickly and yet extract very little heat from the melt. The remainder of the layer below the peaks do not get nearly as hot. Quite significantly, the surface relieving technique of this present invention is effective with high thermally conductive materials, such as copper, as well as with material such as described in U.S. Pat. application Ser. No. 304,352, hence permitting greater latitude in die design and fabrication.

Figure 3:
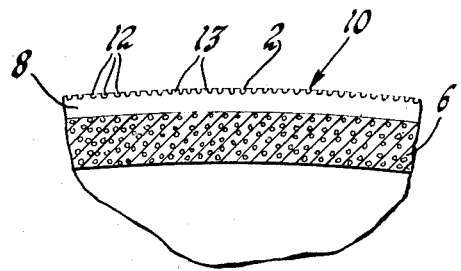
FIG. 3 is an enlarged transverse section along the line 3—3 of FIG. 2.
Figure 2:
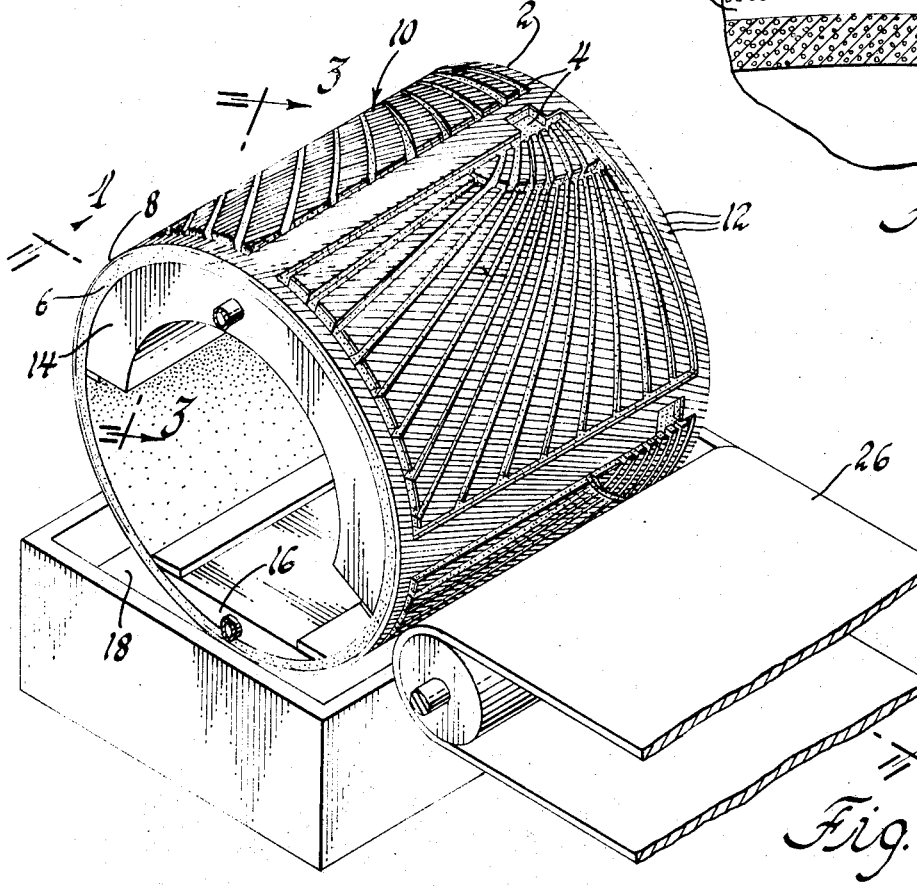
FIG. 2 is an isometric view of a die drum made in accordance with this invention.

More specifically, FIGS. 1–3 show one embodiment of the invention in which a die 2, in the shape of a drum, has mold cavities 4 in the form of battery plate grids. The die 2 comprises a porous metal (e.g., sintered powdered metal) body 6 and an impervious layer 8 covering all of the porous body 6 except the openings to the mold cavities 4. The impervious layer 8 has a relieved outer surface 10 formed by scribing a plurality of striations 12 into the layer 8 to provide a plurality of ridges/peaks 13 and valleys between the ridges. An air pressure chamber 14 behind the mold cavities 4 permits the introduction of pressurized cool air behind porous body 6. The cool air exits out the walls of the cavity 4 thereby cooling the cavity 4 and ejecting the casting from the cavity as described in U.S. Pat. application Ser. No. 304,352. A vacuum chamber 16 behind the mold cavities 4 immediately above the melt 18 sucks melt 18 up into the cavities 4 when the die 2 is immersed too shallowly for melt to flow into the cavity of its own accord.

In the continuous casting operation shown, only the ridges/peaks 13 between the striations contact the melt 18 and their small mass quickly heated thereby to a melt-metal-shedding temperature even without assistance from the supplemental heaters 20. Supplemental heaters 20, if installed, permit greater flexibility in the use of the equipment with different melt alloys, different layer 8 materials and different drum speeds. The mold cavity 4 will have already been cooled when it rotated over the chamber 14 and the cool, pressurized air escaped out of the porous walls of the mold cavities 4. Care is taken to insure that the die 2 is immersed in the melt 18 to a depth which is insufficient to cause the melt head to force melt completely into the valleys/striations 12, hence localizing layer-melt contact to the ridges/peaks 13 on the surface. Immersion depths of less than ⅛ inch and preferably about 1/16 inch are suggested for this purpose. Once in the melt 18, a vacuum is drawn in chamber 16 which sucks melt 18 up into the mold cavity 4 where it immediately freezes. Melt temperatures about 50° above the melt's freezing point or within the melt's freezing range are preferred where quenching of the casting is sought as in the case of age hardenable lead acid battery grids. Due to the initial temperature of the layer 8, its temperature rise while in the melt 18, and its minimal and brief contact with the melt 18, little heat is lost from the melt through the layer 8. Some solidification of the melt 18 occurs as a film on the ridges 13. This film is so non adherent that due to its own weight it falls back into the melt 18 immediately after the die 2 leaves the melt, as illustrated at 22. Hence, for all intents and purposes, the only metal effectively leaving the melt 18 is the metal solidified in the cavities 4. The positive air pressure in the air chamber 14 ejects the casting 24 from the mold and commences cooling of the cavity 4 for the next cycle. The castings 24 are caught by any convenient means, e.g., belt 26 for movement elsewhere in the plant.

One specific example of this invention involves the manufacture of age-hardenable low antimony lead-acid storage battery grids. The die drum is formed from a porous sintered bronze cylinder which is coated with a 0.04 inch layer of impervious copper. A mold cavity in the form of the grid shown in the figures is cut through the copper layer into the porous bronze cylinder to a depth of about 0.03 inch into the porous bronze. A plurality of striations 0.015 inch wide and 0.007 inch deep are scribed into the copper layer to a density of 16 striations per inch. The die 2 is dipped about one sixteenth of an inch into a 650° F. lead alloy melt containing 0.05 percent antimony and rotation begins. Sixty (60) psi, room temperature air is forced through the porous walls of the cavity for about 15 seconds as they pass over the chamber 14. This cools the cavity below the solidus temperature of the melt. As the surface of the drum die rotates into contact with the melt, the tops of the ridges/peaks rapidly heat to a melt-metal-shedding temperature with the rest of the layer heating more slowly by conduction from the peaks. A vacuum of about 5 to 10 inches of water is maintained in the chamber 16 and as the die 2 rotates under the chamber 16, melt metal is sucked into the mold cavities. Contact with the melt lasts only about ½ second before the die rotates out of contact taking with it the casting 24. As the mold cavities rotate over air chamber 14, the castings are blown free.

While I have disclosed my invention in terms of a specific embodiment thereof, I do not intend to be limited thereto except to the extent set forth hereafter in the claims which follow.

I claim:

1. A process for forming intricate, thin-sectioned castings from a metal melt comprising the steps of:
   a. providing a die comprising a porous metal body, an impervious, low thermally conductive layer on the body and a mold cavity in said body opening through said layer, said layer having a relieved outer surface comprising a plurality of peaks and valleys;
   b. passing a cooling gas through said porous metal body and out the walls of said cavity to cool the cavity walls below the solidification temperature of said melt-metal;
   c. shallowly immersing the thusly prepared die into said melt to a depth where said melt contacts only said peaks to thereby rapidly heat said peaks to a melt-metal-shedding temperature without extracting a substantial quantity of heat from said melt through said layer;
   d. applying a vacuum to said porous metal body to suck melt into said cavity;
   e. removing the die from the melt and shedding any melt-metal from said outer surface of the layer to carry away from the melt only metal solidified in said cavity; and
   f. stripping the casting from the cavity.

2. A process for forming intricate, thin-sectioned age-hardenable, lead-acid storage battery grids from a lead alloy melt comprising the steps of:
   a. providing a die comprising a porous metal body, an impervious, low thermally conductive layer on the body and a mold cavity in said body opening through said layer, said layer having a relieved outer surface comprising a plurality of peaks and valleys;
   b. passing a cooling gas through said porous metal body and out the walls of said cavity to cool the cavity walls below the solidification temperature of the melt;
   c. shallowly immersing the thusly prepared die into said melt to a depth where said melt contacts only said peaks to thereby rapidly heat said peaks to a melt-metal-shedding temperature without extracting a substantial quantity of heat from said melt through said layer;
   d. applying a vacuum to said porous metal body to suck melt into said cavity;
   e. quenching said lead alloy in said cavity;
   f. removing the die from the melt and shedding any melt-metal from said surface to carry away from the melt only metal solidified in said cavity;
   g. stripping the thusly formed grid from the cavity; and
   h. allowing the thusly formed grid to age and strengthen.

3. A dip casting die comprising:
   a. a porous metal body adapted to be transpirationally cooled;
   b. an impervious, low thermally conductive layer on the body said layer having a relieved outer surface comprising a plurality of peaks and valleys adapted to prevent casting metal from filling the valleys under shallow immersion conditions;
   c. a mold cavity having porous walls in said body opening through said layer; and
   d. means for introducing cooling gas into said porous metal body for exiting through and transpirationally cooling the porous walls of said cavity.

* * * * *